United States Patent Office 2,783,245
Patented Feb. 26, 1957

2,783,245

PROCESS OF PHTHALOYLATION AMINO ACIDS

Joseph Francis Weidenheimer, Pearl River, and Lawrence Ritter, Valley Cottage, N. Y., and Ferdinand Joseph Richter, Park Ridge, N. J., assignors to American Cyanamid Company, New York, N. Y., a corporation of Maine No Drawing. Application July 27, 1953, Serial No. 370,646

11 Claims. (Cl. 260—326)

This invention relates to an improved process for the preparation of compounds having the general formula:

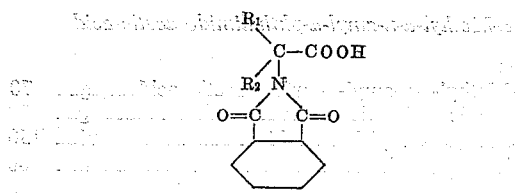

where $R_1$ is hydrogen, alkyl, cycloalkyl, or alkenyl and $R_2$ is an alkyl, cycloalkyl, or alkenyl, or $R_1$ and $R_2$ together represent cycloalkyl.

In the co-pending application of Sydney D. Upham, Serial No. 370,645, filed July 27, 1953, certain new alpha alpha disubstituted alpha phthalimido acetamides are described which have useful anti-convulsant activity. These compounds may be prepared by treating an alpha alpha disubstituted alpha phthalimido acetic acid with a two mole excess of thionyl chloride from 5–10 minutes on a steam bath and then removing the excess thionyl chloride at low temperatures by vacuum distillation to obtain the acid chloride which is then treated with ammonium hydroxide or an amine to obtain the amide.

The alpha alpha disubstituted alpha phthalimido acetic acids used as intermediates appear to be new compounds. The process of preparing them described by Upham in his aforesaid pending application is a fusion process which consists of melting together in anhydrous state equimolar quantities of phthalic anhydride and an amino acid and holding the reactants between the temperatures of 140°–185° C. for a period up to 1 hour. This fusion process, however, has certain disadvantages and shortcomings. For one thing, the yield of desired reaction product is low in most cases. Equally disadvantageous is the fact that the fusion process results in undesirable byproducts. Another factor is the difficulty encountered in handling large amounts of material in such a manner as to get uniform heat transfer, which would make this method impractical on a large scale. Still another disadvantage in the fusion method is the variability of yield according to the different substituents present on the amino acid.

We have found unexpectedly that the compounds of the invention are prepared with more facility and in greatly improved yield by a solvent process in which a particular group of organic amides comprise the usable solvent media. We have found, more specifically, that phthalic anhydride and the desired amino acid can be reacted together and excellent yields of the desired alpha alpha disubstituted alpha phthalimido acetic acids obtained in the presence of a solvent which may be represented by the structural formula:

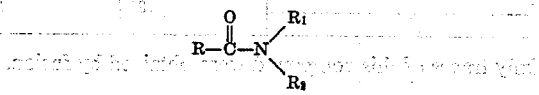

where R, $R_1$ and $R_2$ may be hydrogen or lower alkyl radicals. Suitable solvents include acetamide, formamide, ethyl formamide, ethyl acetamide, diethyl formamide, dimethyl formamide, dimethyl acetamide, and other compounds having the general structure set forth above which have a boiling point of not more than 220° C. Preferred solvents are those in which the groups $R_1$ and $R_2$ are lower alkyl radicals which reduce the reactivity of the solvent with other components of the reaction mixture. It is also preferred that the solvent have a relatively high boiling point, as it is preferred that the reaction be carried out at temperatures varying from about 140°–220° C. These solvents possess the advantage of giving increased yields in a shorter reaction time and prevent or minimize formation of byproducts such as diketopiperazines, phthalamic acids, and the like, which make the purification procedure more difficult.

It is usually advantageous to add a secondary solvent such as dibutyl carbitol or a similar high boiling inert organic compound in an amount sufficient to maintain the reaction or reflux temperature range at 180°–190° C. Upon completion of the reaction (1–8 hours) the desired product is precipitated from the reaction mixture by dilution with water. The precipitate is then recrystallized in the presence of a suitable solvent and then dried.

To illustrate the invention in greater particularity, a number of examples are given to illustrate the preparation of various phthalimido acetic acids using various solvents, reactants, reaction conditions, and the like and to illustrate the improved yields over the fusion process previously referred to. It will be understood that these examples are by way of illustration and are not intended to limit the process to the exact materials or conditions thereof.

EXAMPLE 1

α-Methyl-α-ethyl-α-phthalimido acetic acid

Charge:

| | |
|---|---|
| α-Methyl-α-ethyl-α-amino acetic acid | 50 g. (0.5 mole) |
| Phthalic anhydride | 80 g. (0.5+mole) |
| DMF (dimethyl formamide) | 100 ml. |

The above materials are charged into a 500 ml., round-bottomed flask. Heat is applied by a heating mantle connected to a control. After the reaction mass is in solution heating is continued for three hours under reflux at an ambient temperature of 150° C. After cooling of the contents of the flask to room temperature, it is poured into five times its volume of cracked ice with vigorous mechanical agitation. The solid phthalimido acid is then collected on a Buchner funnel, washed once with cold water (to remove DMF), suspended in 500 ml. of boiling water and filtered while hot to remove the excess or unreacted phthalic acid. The crude acylated amino acid is recrystallized from hot methanol plus a small quantity of Norite and water. Yield: 67.1 g. or 54.5% of theoretical. M. P.: 140°–141° C.

EXAMPLE 2

α-Methyl-α-cyclopropyl-α-phthalimido acetic acid

The procedure of Example 1 was repeated with the exception that α-methyl-α-cyclopropyl-α-amino acetic acid was substituted on a molecular equivalent basis for α-methyl-α-ethyl-α-amino acetic acid. The recrystallized product had a M. P. of about 156–158° C.

EXAMPLE 3

α-Methyl-α-ethyl-α-phthalimido acetic acid

Charge: (in 5 liter flask)

| | |
|---|---|
| α-Methyl-α-ethyl-α-amino acetic acid | 605 g. (5.0 mole) |
| Phthalic anhydride | 800 g. |
| DMF (dimethyl formamide) | 1000 ml. |
| Dibutyl Carbitol | 500 ml. |

The procedure is the same as in Example No. 1, except that prior to assembly of the apparatus equipped with a Soxhlet extractor and condenser, a thimble half-filled with silica gel is inserted into the Soxhlet. Heating is continued for two hours at an ambient temperature of 175°–180° C. Yield: 924 g. or 76% of theoretical. M. P.: 140°–141° C.—Sharp. The yields of this compound obtained from the two dry fusion runs were 37.3% and 53.5%, respectively.

EXAMPLE 4

α,α-Diethyl-α-phthalimido acetic acid

Charge:

| | | |
|---|---|---|
| α,α-Diethyl-α-amino acetic acid | g | 1500 |
| Phthalic anhydride | g | 1600 |
| DMF (dimethyl formamide) | ml | 3000 |
| Dibutyl Carbitol | ml | 1500 |

Prepared in the same manner outlined in Example No. 3, except that the reflux time and temperature were four hours at 180° C. The crude phthalimido acid was isolated at follows. Most of the DMF-Dibutyl Carbitol was stripped off under vacuum immediately upon the completion of the reaction. Upon cooling the protected amino acid was precipitated on ice as usual, sucked as dry as possible on a Buckner funnel and then boiled in toluene to azeotrope off the water. Upon a small addition of Norite, the phthalimido acid was obtained in a pure and dry state from the toluene by the addition of small quantities of petroleum ether. Yield: 2348 g. or 78% of theoretical. M. P.: 164°–165° C.

EXAMPLE 5

α,α-Diethyl-α-phthalimido acetic acid 0.1 mole of α,α-diethyl-α-amino acetic acid and 0.15 mole of phthalic anhydride were refluxed in 40 ml. dimethylacetamide (DMA) for 2 hours at 165° C. The clear solution was poured into 400 ml. of water, yielding an immediate precipitate. This precipitate was extracted with hot water and then recrystallized from boiling xylene. Yield: 13.5 Gm.–76% of theory. M. P.: 160°–163° C. The yields of this compound obtained from 6 dry fusion experiments averaged 50.3%.

EXAMPLE 6

α-Methyl-α-isopropyl-α-phthalimido acetic acid

Charge:

| | | |
|---|---|---|
| α-Methyl-α-isopropyl-α-amino acetic acid | g | 65 |
| Phthalic anhydride | g | 80 |
| DMF (dimethyl formamide) | ml | 130 |
| Dibutyl Carbitol | ml | 60 |

Refluxed for 4 hours as in Example No. 3. Recrystallized from 2B ethanol and water. Yield: 104 g. or 80% of theoretical. M. P.: 159°–161° C. The yield of this compound from 3 dry fusion runs averaged 37.2%.

EXAMPLE 7

α,α-Tetramethylene-α-phthalimido acetic acid

Charge:

| | | |
|---|---|---|
| α,α-Tetramethylene-α-amino acetic acid | g | 40 |
| Phthalic anhydride | g | 80 |
| DMF (dimethyl formamide) | ml | 100 |
| Dibutyl Carbitol | ml | 50 |

Prepared in the same manner as outlined in Example No. 3. Yield: 75 g. or 90% of theoretical. M. P.: 158°–159° C. The yield of this compound by dry fusion from 0.1 mole run was 81.4%.

EXAMPLE 8

α-Methyl-α-isobutyl-α-phthalimido acetic acid

Charge:

| | | |
|---|---|---|
| α-Methyl-α-isobutyl-α-amino acetic acid | g | 70 |
| Phthalic anhydride | g | 90 |
| DMF (dimethyl formamide) | ml | 150 |
| Dibutyl Carbitol | ml | 60 |

Prepared in the same manner as outlined in Example No. 6. Yield: 102 g. or 72% of theoretical. M. P.: 151°–153° C. The yield of this compound obtained by dry fusion from 0.1 mole run was 12.5%.

EXAMPLE 9

α-Methyl-α-n-amyl-α-phthalimido acetic acid

Charge:

| | | |
|---|---|---|
| α-Methyl-α-n-amyl-α-amino acetic acid | g | 70 |
| Phthalic anhydride | g | 90 |
| DMF (dimethyl formamide) | ml | 150 |
| Dibutyl Carbitol | ml | 60 |

Prepared in the same manner as outlined in Example No. 3, refluxed for 5 hours. Yield: 89 g. or 65% of theoretical. M. P.: 99°–100° C. The yield obtained by dry fusion from 0.2 mole run was 36%.

EXAMPLE 10

α-Ethyl-α-n-propyl-α-phthalimido acetic acid

Charge:

| | | |
|---|---|---|
| α-Ethyl-α-n-propyl-α-amino acetic acid | g | 78 |
| Phthalic anhydride | g | 85 |
| DMF (dimethyl formamide) | ml | 150 |
| Dibutyl Carbitol | ml | 75 |

Prepared in the same manner as outlined in Example No. 5, except refluxed for 8 hours at 185° C. Recrystallized from methyl-ethyl ketone and petroleum ether. Yield: 98 g. or 62% of theoretical. The yield obtained from 0.2 mole dry fusion experiment was 29%.

EXAMPLE 11

α-Ethyl-α-butyl-α-phthalimido acetic acid 79.5 Gm. (0.5 mole) of α-ethyl-α-butyl-α-amino acetic acid and 75 Gm. (9.5 mole +) of phthalic anhydride were refluxed in 250 ml. DMF for 5 hours. Solution was cooled and poured into several liters of cold water. The oil solidified on standing and the supernatant decanted. The residue was dissolved in 250 ml. xylene by refluxing for 1 hour until clear, with water being azeotroped off. Upon the addition of 270 ml. petroleum ether the phthalimido acid began to crystallize. After standing overnight in chill room the crystals were colected, washed with xylene-petroleum ether and vacuum dried.

Wt.: 93 gm. Yield: 61%. M. P.: 120°–122° C.

Analysis for $C_{16}H_{23}O_3N_3$:

| | Calculated | Found |
|---|---|---|
| | Percent | Percent |
| C | 66.42 | 66.68 |
| H | 6.62 | 6.03 |
| N | 4.84 | 4.78 |

Only traces of this compound were obtained by fusion.

EXAMPLE 12

Phthalimidoleucine 13 gm. (0.1 mole) of leucine and 22 gm. (0.15 mole) of phthalic anhydride were refluxed for 2¾ hours in 40 ml. of DMF (dimethyl formamide). 25 ml. of solvent were then distilled off and the residue poured into 400 ml. cracked ice. The oily material that deposited solidified within 1 hour and was extracted with 200 ml. hot water. The water-insoluble material was recrystallized from alcohol-water.

Wt.: 19 gm. Yield: 73%.

EXAMPLE 13

α,α-Diethyl-α-phthalimido acetic acid

Charge:                                        Mole
α,α-Diethyl-α-amino acetic acid_____  0.1
Phthalic anhydride_____ 0.15
Acetamide _____ 0.8

The mixture of the above ingredients was heated at 180°–200° C. for ½ hour. The reaction mixture was poured into water, the precipitated solid collected and washed with boiling water. The crude material was recrystallized from boiling xylene to give a small yield of the desired phthalimido acid, having a melting point of 152°–155° C. 8.5 gm. of xylene insoluble material was also obtained, having a melting point of 230°–233° C. This was found to be phthalimide. The formation of this by-product is serious when acetamide or formamide is used but is impossible with the di-substituted amides (DMF and DMA) because of the absence of replaceable hydrogens.

To illustrate the conversion of the above described phthalimido acids into pharmacologically active anti-convulsants, the following example is given by way of illustration. Other phthalimido acetamides are prepared in the same manner using the desired phthalimido acetic acid and/or a desired amine.

EXAMPLE 14

α - Ethyl - α - propyl - α - phthalimidoacetic acid (2.75 gms.—0.1 mole) was added to thionyl chloride (1.4 cc.—0.2 mole) and 20 cc. of benzene. This was heated on the steam bath for 10 minutes, cooled and the benzene and excess thionyl chloride removed by vacuum distillation. The residue was dissolved in 5 cc. of dry dioxane, then cooled to 0° C. and added to cold concentrated NH₄OH (40 cc.) at −10 to −20° C. The amide precipitated and rapidly crystallized. It was removed by filtration and recrystallized from acetone and water.

What is claimed is:

1. A method of preparing alpha phthalimido acetic acids which comprises the step of heating together phthalic anhydride and an alpha amino acid in a solvent having the general formula:

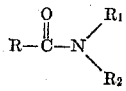

in which R, R₁ and R₂ are radicals of the group consisting of hydrogen and lower alkyl radicals.

2. A method of preparing alpha phthalimido acetic acids which comprises the step of heating together at a temperature within the range 140°–220° C. phthalic anhydride and an alpha amino acid in a solvent having the general formula:

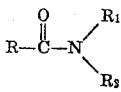

in which R, R₁ and R₂ are radicals of the group consisting of hydrogen and lower alkyl radicals.

3. A method of preparing alpha alpha dialkyl substituted phthalimido acetic acids which comprises the step of heating together phthalic anhydride and an alpha alpha dialkyl substituted amino acetic acid at a temperature within the range 140–220° C. in a solvent having the general formula:

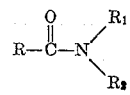

in which R, R₁ and R₂ are radicals of the group consisting of hydrogen and lower alkyl radicals.

4. A method of preparing alpha phthalimido acetic acids which comprises the step of heating together at a temperature within the range 140°–220° C. phthalic anhydride and an alpha amino acid in diethyl formamide.

5. A method of preparing alpha phthalimido acetic acids which comprises the step of heating together at a temperature within the range 140°–220° C. phthalic anhydride and an alpha amino acid in dimethyl formamide.

6. A method of preparing alpha phthalimido acetic acids which comprises the step of heating together at a temperature within the range 140°–220° C. phthalic anhydride and an alpha amino acid in dimethyl acetamide.

7. A method of preparing α-methyl-α-ethyl phthalimido acetic acid which comprises the step of heating together phthalic anhydride and α-methyl-α-ethyl-amino acetic acid in a solvent having the general formula:

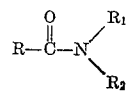

in which R, R₁ and R₂ are radicals of the group consisting of hydrogen and lower alkyl radicals.

8. A method of preparing α,α-diethyl-α-phthalimido acetic acid which comprises the steps of heating together phthalic anhydride and α,α-diethyl-α-amino acetic acid in a solvent having the general formula:

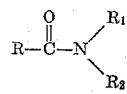

in which R, R₁ and R₂ are radicals of the group consisting of hydrogen and lower alkyl radicals.

9. A method of preparing α-ethyl-α-n-propyl-α-phthalimido acetic acid which comprises the steps of heating together phthalic anhydride and α-ethyl-α-n-propyl-α-amino acetic acid in a solvent having the general formula:

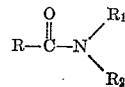

in which R, R₁ and R₂ are radicals of the group consisting of hydrogen and lower alkyl radicals.

10. A method of preparing α-methyl-α-isopropyl-α-phthalimido acetic acid which comprises the steps of heating together phthalic anhydride and α-methyl-α-isopropyl-α-amino acetic acid in a solvent having the general formula:

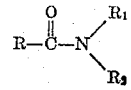

in which R, R₁ and R₂ are radicals of the group consisting of hydrogen and lower alkyl radicals.

11. A method of preparing α,α-tetramethylene-α- phthalimido acetic acid which comprises the steps of heating together phthalic anhydride and α,α-tetramethylene-α-amino acetic acid in a solvent having the general formula:

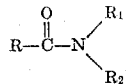

in which R, R₁ and R₂ are radicals of the group consisting of hydrogen and lower alkyl radicals.

References Cited in the file of this patent

UNITED STATES PATENTS

| | | |
|---|---|---|
| 2,447,587 | Martin et al. | Aug. 24, 1948 |
| 2,544,660 | Duschinsky | Mar. 13, 1951 |
| 2,566,992 | Morgan et al. | Sept. 4, 1951 |
| 2,676,188 | Bruce et al. | Apr. 20, 1954 |

FOREIGN PATENTS

| | | |
|---|---|---|
| 1,012,765 | France | Apr. 23, 1952 |